(12) United States Patent
Whitehead

(10) Patent No.: US 6,836,395 B2
(45) Date of Patent: Dec. 28, 2004

(54) PROTECTIVE RELAY SYSTEM HAVING SETTINGS PROVIDED THEREIN FOR ALL PROTECTIVE RELAY LOCATIONS IN A POWER SYSTEM

(75) Inventor: David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 80 days.

(21) Appl. No.: 10/213,015

(22) Filed: Aug. 5, 2002

(65) Prior Publication Data

US 2004/0153758 A1 Aug. 5, 2004

(51) Int. Cl.[7] ............................................... H02H 3/00
(52) U.S. Cl. ........................................................ 361/64
(58) Field of Search ............................ 361/62–69, 115; 307/38, 40, 42

(56) References Cited

U.S. PATENT DOCUMENTS

| | | | | |
|---|---|---|---|---|
| 5,041,737 A | * | 8/1991 | Schweitzer et al. | ......... 307/125 |
| 5,596,263 A | * | 1/1997 | Zavis et al. | .................. 323/255 |
| 6,035,263 A | * | 3/2000 | Jeon | ............................ 702/122 |
| 6,239,960 B1 | * | 5/2001 | Martin | ......................... 361/86 |
| 6,496,342 B1 | * | 12/2002 | Horvath et al. | ................ 361/65 |

* cited by examiner

*Primary Examiner*—Ronald Leja
(74) *Attorney, Agent, or Firm*—Cook, Alex, McFarron, Manzo, Cummings & Mehler, Ltd.

(57) ABSTRACT

A protective relay system for a power system having protective relays at specific locations in the system. Each location has specific setting information for the relay for operation of the relay at that location. Each relay in the protective relay system includes in memory all of the setting information for all of the locations in the power system. Connection of the relay to a key identifier member at a desired location, in one embodiment, provides an identification of that location to the relay. The identification may also be provided by a system computer to which the relay is connected at the desired location. The relay uses the information to obtain the correct setting information for the desired location from its memory for proper protection operation at the desired location, eliminating programming of replacement relays.

9 Claims, 2 Drawing Sheets

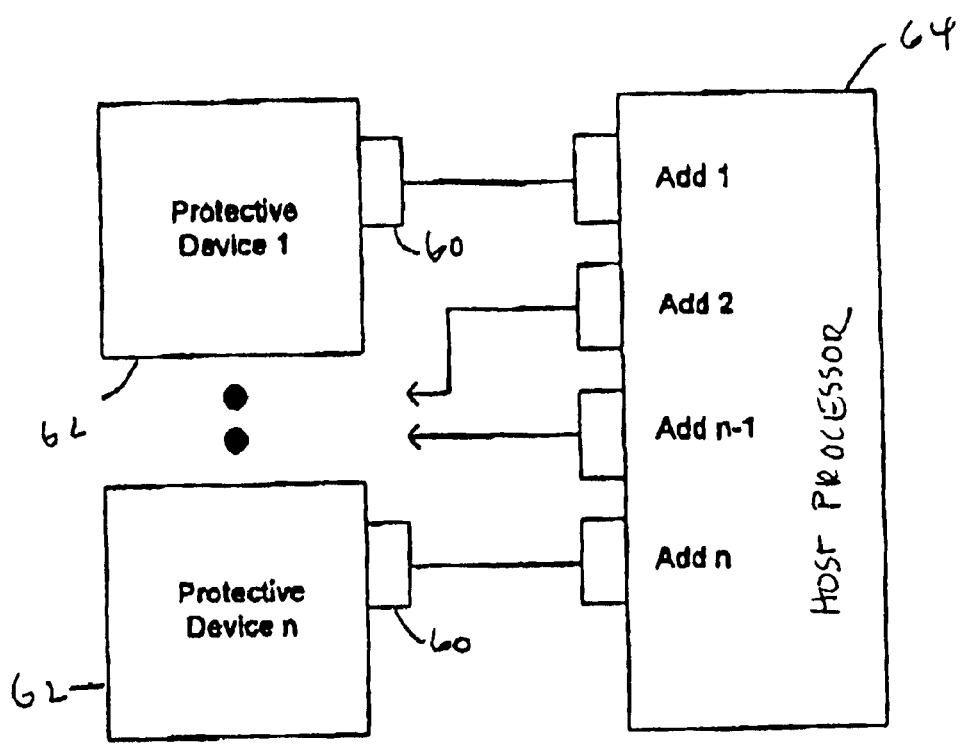

PROTECTIVE RELAY SYSTEM HAVING SETTINGS PROVIDED THEREIN FOR ALL PROTECTIVE RELAY LOCATIONS IN A POWER SYSTEM

TECHNICAL FIELD

This invention relates generally to the predetermined settings used in a microprocessor-based protective relay for power systems, and more particularly concerns a protective relay system in which the protective relays themselves, i.e. the hardware, in the relay system are identical, with the settings in each relay depending on their particular location in the power system.

BACKGROUND OF THE INVENTION

Protective relays, including microprocessor-based protective relays, are used to detect faults in power systems and then to isolate the fault-affected portion of the power system. Typically, a plurality of such protective relays are positioned at various selected locations in the power system to provide comprehensive fault protection. In a small power system, for instance, six or seven protective relays may be used, while a somewhat larger system could include 20 protective relays or more. Very large systems can use as many as 500 relays.

In the smaller power systems, the relays used may be all the same (the identical hardware), with each relay having software setting information and operational firmware specifically adapted to the specific type of protection to be performed at each particular point in the power system. In addition to the particular protection functions carried out in accordance with the setting information, the number of electrical connections, i.e. connections with current transformers (CTs) and voltage (potential) transformers (PTs) will vary from location to location, as will the number of external interfaces. The specific location-based information is provided in the relay used at that location. The actual relay (hardware) will, as indicated above, often be the same from location to location (only one type of relay thus needs to be purchased), with the hardware capability being determined by the highest (most demanding) requirements location.

Historically, if a protective relay should fail within the system, a new relay, typically with default settings provided at the factory, is obtained, usually from an on-site or geographically close supply. The relay, however, must be programmed with the particular settings previously determined for the particular location of the relay to be replaced. This can be done either at the site itself or at the warehouse, manually with a dumb terminal or with a computer software package, or by other means.

However, this programming process for the replacement relay is prone to human error, because the correct settings for the particular relay which is being replaced must first be selected from a relatively large database, and then those settings must be manually entered into the relay.

SUMMARY OF THE INVENTION

Accordingly, the present invention is a protective relay system and corresponding method for use in a power system which has a plurality of protection locations for the protective relays, wherein the settings for the protection operation of the protective relays at each location are known, as well as the connection requirements between the protective relays and the power system for each location, wherein the relay system/method comprises: a plurality of protective relays for a power system, each relay having a memory for storing a plurality of groups of setting information, wherein the relay includes setting information for each of the protection locations in the power system; a key identifier member at each location in the power system at which a protective relay is to be located, providing information which identifies, directly or indirectly, the setting information used at each location; and an assembly in each relay for receiving the key member identifying information, wherein when power is supplied to a relay in the relay system, the relay gains knowledge of the particular setting information used at the location from the key member connected thereto, permitting the relay to obtain from memory the setting information for that location to operate in accordance therewith.

The invention also includes a protective relay system and corresponding method for use in a power system which has a plurality of protection locations for the protective relays, the protective relay system comprising: a plurality of protective relays for use in a power system, each protective relay having a memory for storage of a plurality of groups setting information, wherein the relay includes setting information for each of the protection locations in the power system; and a system computer which is linked uniquely to each location in the power system and includes identifying information which identifies, directly or indirectly, the setting information for each protective relay location, and for providing that information upon request from a protective relay at a given location, wherein the protective relay uses the setting information so identified to perform the protection functions required at that location.

BRIEF DESCRIPTION OF THE DRAWING

FIG. 3 shows a simplified diagram showing another embodiment of the present invention.

BEST MODE FOR CARRYING OUT THE INVENTION

Figure 1:
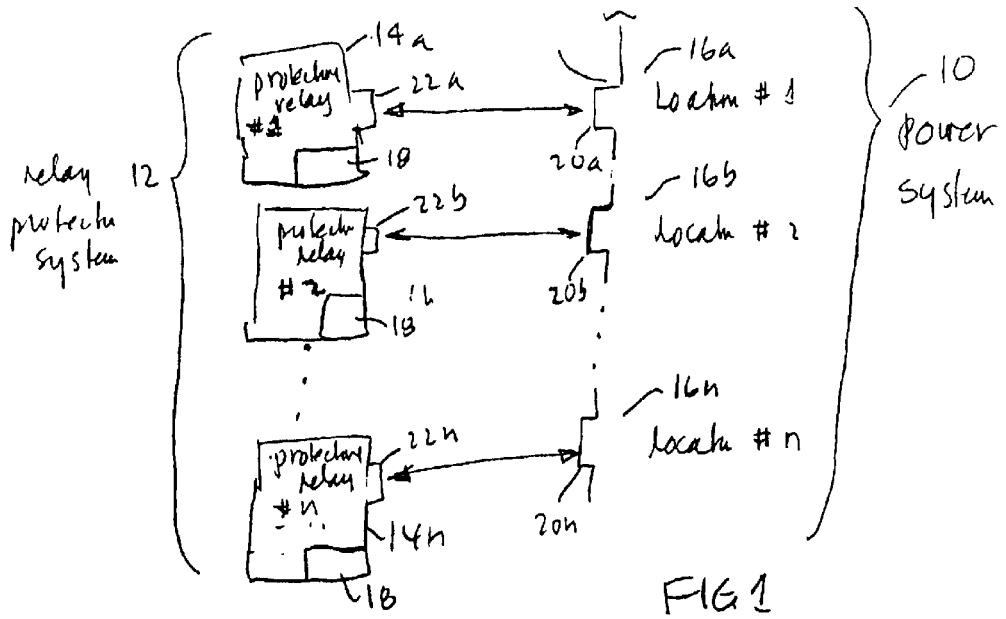
FIG. 1 shows a generalized block diagram of a relay system of the present invention.

Referring to FIG. 1, a power system 10 will include a selected plurality of protective relays as part of a relay protection system referred to generally at 12. Individual relays 14a–14n are positioned at selected physical locations 16a–16n in the power system 10, with each relay providing specific selected protection of portions of the system. In many cases, particularly in smaller power systems, many if not all of the relays will be the same, i.e. relays having the same hardware will be used throughout the system. Typically, this will mean using a plurality of the same model relays.

The relay used in the protective system is chosen with a hardware capability that accommodate the highest requirements of all of the possible relay locations on the system. The hardware capability includes specific protection functions as well as the maximum number of analog connections required at any of the locations as well as communication interfaces at that location. Possible protection functions in a power system include: overcurrent, time-overcurrent, line current differential and over-under frequency, as examples.

The protective relay 14 used in the system must have the hardware functional capability of providing all of the various types of relay-provided protection used for the power system 10. Different locations in the power system may require a different number of PTs (potential transformers) and CTs (current transformers). At one location, only three CTs may be required to perform the desired protection, while at another location, a different number of CTs are required. The relay must have the capability of supporting the largest number of connections needed at any of the locations. In summary, the relay hardware platform must be able to support the protection and connection requirements of all of the relay locations in the system.

As indicated above, however, each location in the system will have its own particular protection and connection requirements. The protection functions for the relay at each location are established by the use of system settings, inputted into the device by a trained operator. In the system of the present invention, however, instead of the relay at each location having just its own setting information, the relay includes setting information for all of the locations. The setting information for each location within the power system is stored in non-volatile memory 18 in each relay, with a unique address which indicates or is associated with each group of setting information with its associated location.

The present system includes an identifier key member 20a–20n, at each of the locations (such as in the relay mounting rack) and a mating plug element 22a–22n at each relay. More particular, each location in the power system includes a mounting rack into which the relay is positioned. At each such mounting rack, an identifier key member 20 is located, which includes a connector element. The identifier key member identifies that location relative to all the other locations in the power system, i.e. the identifier key will be different for each location, or alternatively the key number identifies the group of setting information or the address thereof in the relay. The key member is connected to a corresponding plug element 22 in the relay.

When power is applied to the relay present at a particular physical location in the power system, the relay interrogates the connected identifier key member 20 at that location through the relay plug element 22, and the relay is pointed to the unique memory address in the relay which contains is the protective settings/connections information for that particular physical location. The relay then uses those identified settings to perform the particular protection functions required at that location.

Figure 2:
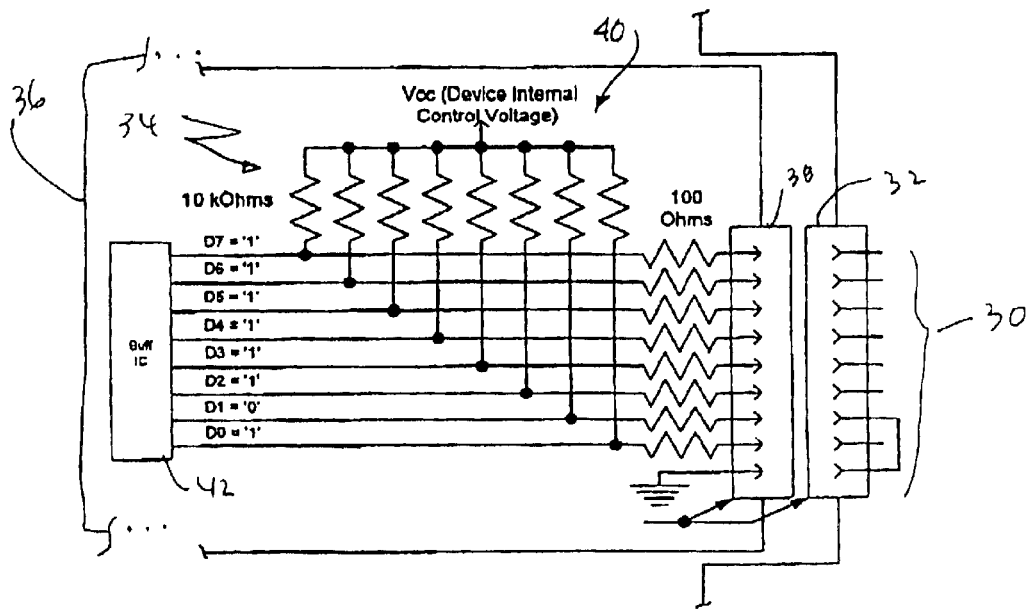
FIG. 2 is a diagram showing a hardware connection component of the present system.

FIG. 2 shows a more detailed view of the key/plug arrangement. A nine-pin identifier key 30 for example is provided at each equipment rack the power system. Eight pins are used to identify the unique address in the relay memory containing the desired setting information for the location or to identify the setting information by a code number of some kind. The ninth pin is used for ground, minimizing the occurrence of ground loops. The nine-pin key in the embodiment shown is provided in an identifier key member 32 with individual pin connections. The plug element 34 at the relay 36 includes a receiving portion in a connecting element 38. The receiving portion connections are conveniently mateable with the pin elements in the identifier key member 32. The plug element 34 also includes a circuit 40 for reading the particular pin arrangement provided by the identifier key 30. The information is provided by key 30 to a buffer memory 42. Eight address pins will give a capability of 256 different locations to be identified; typically this will be sufficient for a power system.

FIG. 3 shows an alternative digital/software key arrangement. In this embodiment, a serial port 60 on each relay 62—62 in the system is connected to a system host processor 64. Each location in the power system thus will have its own unique link to the computer. At power-up of relay 62 (such as a replacement relay), it will interrogate the host processor 64 for the memory address or other identifier for the group of setting information associated with the location of the replacement relay; the host computer 64 will then respond with the desired, known setting information for that location or information for the location of the setting information in the relay memory. The relay 62 will then operate at the selected location with those settings.

As indicated above, each relay in the power system will have the setting information for all of the relay locations, each setting information having a unique address in relay memory.

The advantage to the above system is that it eliminates errors in implementing setting information for replacement relays. Since each relay in the system, including the spare relays for the power system, includes the settings/connections information for all of the locations, the identification of the location and/or the address for the setting information for that location will eliminate any human error which might occurring during programming of the replacement device. There is no programming of replacement relays, since the setting information for the particular location is already in the relay.

If no identifier key is provided to a relay when it is located in the equipment rack and is connected, the relay knows that it is to be used in a stand-alone manner, without specific setting information already in the relay; i.e. it uses the default settings in the relay.

The protective relay reads the identifying information provided by the identifier key member and will compare that information against information identifying the desired location of the relay from the relay's memory. Alternatively, the location information can be displayed for use by a technician. If the two do not agree, then the relay is not enabled for operation until the setting information provided by the key member is accepted.

In an additional feature of the system, the protective relays in the system have the ability to report the key number for the location of the relay.

With the present system, the user is only required to stock a single type of protective relay for the system, reducing the number of different protection devices that must be kept in supply. The setting information for replacement relays does not have to be inputted into the relay. Upon failure of a relay, the user simply removes the failed relay and installs a new one (identical in hardware), with the new one having all of the possible-setting combinations for each location. The correct setting information is identified by the key at the location of the computer.

Although a preferred embodiment of the invention has been described for purposes of illustration, it should be understood that various changes, modifications and substitutions may be incorporated in the embodiment without departing from the spirit of the invention, which is defined in the claims which follow.

What is claimed is:

1. A protective relay system for use in a power system which has a plurality of protection locations for the protective relays, wherein the settings for protection operation of the protective relays at each location are known, as well as the connection requirements between the protective relays and the power system for each location, the relay system comprising:

a plurality of protective relays for a power system, each relay having a memory for storing a plurality of groups of setting information, wherein the relay includes setting information for each of the protection locations in the power system;

a key identifier member at each location in the power system at which a protective relay is to be located, comprising a plurality of address pins configured in a particular arrangement, wherein said address pin arrangement identifies the location in the power system at which the protective relay is located, said key identifier member further adapted to identify, directly or indirectly, an address in the relay memory containing the setting information for a relay used at each location; and an assembly in each relay for receiving the key member identifying information, wherein as power is supplied to a relay in the relay system, the relay gains knowledge of the particular setting information used at the location from the key member connected thereto, permitting the relay to obtain from memory the setting information for that location and operates in accordance therewith.

2. A system of claim 1, wherein each relay in the relay system has the same hardware capability, and wherein the relay system includes a plurality of replacement relays, each of which contain all of the setting information for each of the locations, wherein the replacement relays do not require any programming to be operational after their connection thereof to the relay system.

3. A system of claim 1, including a connector assembly, one part, of which includes the key member and another part of which is part of the receiving assembly.

4. A system of claim 1, wherein the receiving assembly includes a circuit for reading the key information identifying the location provided by the key member.

5. A system of claim 1, wherein each relay includes the capability of reporting the location of the relay to the user.

6. A system of claim 1, wherein the relay further comprises a buffer memory for storing an identifier key such that the relay is prevented from operating if the actual location of the relay does not agree with the identifier key stored in the buffer memory.

7. A method for convenient, error-free replacement of protective relays in a power system which includes a plurality of protection locations for the protective relays, wherein the settings for protection operation of the protective relays at each location are known, including the connection requirements between the protective relays in the power system for each location, comprising the steps of:

removing a relay to be replaced at a given location in the power system;

connecting a replacement relay at the given location to a key identifier member at the given location, the key identifier member, comprising a plurality of address pins configured in a particular arrangement, wherein said address pin arrangement identifies the location in the power system at which the protective relay is located, said key identifier member further adapted to identify, either directly or indirectly, an address in the relay memory containing the setting information for a relay used at each location, wherein the replacement relay includes setting information for each of the protection relocations in the power system;

obtaining the identifying information from the key member, and;

obtaining the setting information in memory associated with the identity information, wherein the relay thereafter operates with the obtained setting information.

8. A method of claim 7, wherein each relay in the relay system has the same hardware capability, and wherein the relay system includes a plurality of replacement relays, each of which contain all of the setting information for each of the locations, wherein the replacement relays do not require any programming to be operational after their connection thereof to the relay system.

9. A method of claim 7, wherein the relay further comprises a buffer memory for storing an identifier key such that the relay is prevented from operating if the actual location of the relay does not agree with the identifier key stored in the buffer memory.

* * * * *